US011805200B2

(12) United States Patent
Trim et al.

(10) Patent No.: US 11,805,200 B2
(45) Date of Patent: Oct. 31, 2023

(54) DETECTING AND RESOLVING FRAUDULENT CALLS

(71) Applicant: International Business Machines Corporation, Armonk, NY (US)

(72) Inventors: Craig M. Trim, Ventrura, CA (US); Shikhar Kwatra, San Jose, CA (US); Hemant Kumar Sivaswamy, Pune (IN); Joyce Miryam Habbouche, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 17/648,863

(22) Filed: Jan. 25, 2022

(65) Prior Publication Data
US 2023/0239400 A1 Jul. 27, 2023

(51) Int. Cl.
*G10L 15/04* (2013.01)
*H04M 3/42* (2006.01)
(Continued)

(52) U.S. Cl.
CPC ......... *H04M 3/42221* (2013.01); *G10L 15/18* (2013.01); *G10L 15/26* (2013.01); *H04M 3/38* (2013.01)

(58) Field of Classification Search
CPC ..... H04M 3/42221; H04M 3/38; G10L 15/18; G10L 15/26; G06F 18/2413
See application file for complete search history.

(56) References Cited

U.S. PATENT DOCUMENTS

| 5,805,686 A | 9/1998 | Moller |
| 8,774,372 B2 * | 7/2014 | Metz ................. H04M 3/42221 379/88.19 |

(Continued)

FOREIGN PATENT DOCUMENTS

| CN | 103458412 A | 12/2013 |
| CN | 103179122 B | 11/2015 |

OTHER PUBLICATIONS

"Method to detect fraudulent activities on local banks based on people behavior", An IP.com Prior Art Database Technical Disclosure, Disclosed Anonymously, IP.com No. IPCOM000256902D, IP.com Electronic Publication Date Jan. 8, 2019, 8 pages.

(Continued)

*Primary Examiner* — Md S Elahee
(74) *Attorney, Agent, or Firm* — Edward P. Li (57) ABSTRACT

Computer-implemented methods, computer program products, and computer systems for detecting and resolving fraudulent calls. The computer-implemented methods include one or more processors configured for receiving voice call data corresponding to an incoming telephone call placed to a user device, wherein the voice call data comprises caller voice data. Further, the computer-implemented methods may include one or more processors configured for converting the caller voice data to caller text data comprising one or more text phrases. Further embodiments of the computer-implemented method include processors configured for determining that the one or more text phrases satisfies a first condition, and responsive to determining that the one or more text phrases satisfies the first condition, transmitting a user alert to the user device.

20 Claims, 5 Drawing Sheets

(51) Int. Cl.
*H04M 3/38* (2006.01)
*G10L 15/18* (2013.01)
*G10L 15/26* (2006.01)

(56) References Cited

U.S. PATENT DOCUMENTS

| | | | |
|---|---|---|---|
| 9,532,227 | B2 | 12/2016 | Richards |
| 10,250,755 | B2 | 4/2019 | Richards |
| 10,616,411 | B1 | 4/2020 | Chang |
| 11,005,992 | B1 | 5/2021 | Chang |
| 2009/0144068 | A1* | 6/2009 | Altberg ............. G06Q 30/02 705/342 |
| 2023/0082094 | A1* | 3/2023 | Keret ................. G10L 17/12 726/2 |
| 2023/0162051 | A1* | 5/2023 | Lv .................... G06F 18/2413 706/12 |

OTHER PUBLICATIONS

"System and Method for Automatic Performance Enhancement Process for Deployed Cognitive Voice Phishing Detection Systems", An IP.com Prior Art Database Technical Disclosure, Disclosed Anonymously, IP.com No. IPCOM000265664D IP.com Electronic Publication Date May 4, 2021, 10 pages.

"System and Method for Detection of Computer-generated Speech Impersonations", An IP.com Prior Art Database Technical Disclosure, Disclosed Anonymously, IP.com No. IPCOM000253051D, IP.com Electronic Publication Date Mar. 1, 2018, 3 pages.

"System and Method for Identifying Populations At Risk for Fraud", An IP.com Prior Art Database Technical Disclosure, Disclosed Anonymously, IP.com No. IPCOM000259578D, Electronic Publication Date Aug. 23, 2019, 3 pages.

Bhargava et al., "A Predictive Model to Help Identify Intimate Partner Violence Based on Diagnoses and Phone Calls", American Journal of Preventive Medicine, 41(2), 2011, 129-135.

Cimpanu, Catalin, "AT&T, Comcast successfully test SHAKEN/STIR protocol for fighting robocalls: AT&T and Comcast successfully test first SHAKEN/STIR-authenticated call between two different networks", ZD Net, Mar. 20, 2019, 6 pages, <https://www.zdnet.com/article/at-t-comcast-successfully-test-shakenstir-protocol-for-fighting-robocalls/>.

Hollmen et al., "Call-based Fraud Detection in Mobile Communication Networks using a Hierarchical Regime-Switching Model", Proceedings of Advances in Neural Information Processing Systems 11 (NIPS), Denver Colorado, Nov. 30, 1998, 7 pages.

Tseng et al., "FrauD: Graph-Mining-based Framework or Fraudulent Phone Call Detection", Proceedings of the International Conference on Knowledge Discovery and Data Mining (KDD), Aug. 11-14, 2015, Sydney, Australia, 10 pages.

Vaas, Lisa, "Detecting phone scammers automatically through keyword and voice tone analysis", Sophos, Mar. 22, 2012, 9 pages, <https://nakedsecurity.sophos.com/2012/03/22/detect-phone-scammers/>.

* cited by examiner

DETECTING AND RESOLVING FRAUDULENT CALLS

BACKGROUND

The present invention relates generally to the field of data processing, and more particularly to detecting and resolving fraudulent calls.

Communications fraud is defined as the use of telecommunication technologies with bad intentions such as illegally acquiring money or other information from a person. Telephone-based fraud on credit/debit cards and insurance are on the rise all over the world. Published articles show that an estimated one in every ten American adults lost money in a phone scam in 2017. On average, each scam victim lost $430, totaling about $9.5 billion overall, representing an increase of 56% from 2015, when victims on average lost about $274 each. Financial scams occur when fraudsters, pretending to be from a financial institution, make calls to existing customers soliciting confidential information used to access financial resources. The fraudsters then use customer confidential information to make fraudulent transactions, often trying to victimize banking customers while under distress or luring them into a false sense of urgency or danger. Furthermore, in 2014, the estimated loss on cards due to telephone banking fraud was 9,072 million Pounds.

SUMMARY

Aspects of the present invention disclose computer-implemented methods, computer program products, and computer systems for detecting and resolving fraudulent calls. The computer-implemented method may include one or more processors configured for receiving voice call data corresponding to an incoming telephone call placed to a user device, wherein the voice call data comprises caller voice data. Further, the computer-implemented method may include one or more processors configured for converting the caller voice data to caller text data comprising one or more text phrases. Further the computer-implemented method may include one or more processors configured for determining that the one or more text phrases satisfies a first condition, and responsive to determining that the one or more text phrases satisfies the first condition, transmitting a user alert to the user device.

DETAILED DESCRIPTION

Embodiments of the present invention describe computer-implemented methods, systems, and computer program products for detecting and resolving fraudulent calls.

Aspects of the present invention recognize that additional security measures in place between unidentified callers and customers of insurance companies, financial institutions, and other types of companies or businesses would significantly decrease the likelihood of customers falling victim to fraudulent acts committed against them. There are various types of fraud committed in order to gain information on credit and debit cards, one of them being telephone-based fraud. Once security is implemented through an application for the customers who use credit/debit cards, these calls can be blocked and reported effectively. This will result in enhanced overall security of cards and huge savings for banks.

Aspects of the present invention provide computer-implemented methods to interject on an active telephone call by placing the callers on hold and informing the user not to share credentials based on determining a risk factor of the call. The risk factor of the call may be determined based on engagement and prior history. If the call is determined to exceed a risk factor threshold, embodiments of the present invention may be configured to route the user to involve a software agent/chatbot to intercede the call and prevent the user from sharing confidential information or simply wasting time with the call. For example, embodiments of the present invention may be configured to automatically ask the caller for an official call back number and identification, attempt a call back, or perform an automated lookup on the call back number to determine the validity of the call or authority of the caller to make the call to the user.

As described herein, a data driven machine learning approach is provided to identify fraudulent calls to users by compiling a labeled dataset of phrases (e.g., voice phrases, text phrases) and training multiple models on sentence embeddings and syntactic features. Natural language interaction is a difficult task for machines to master because natural language utterances can be highly unstructured, and their content can vary widely. However, various phrases may be classified as being associated with either a fraudulent call or a legitimate call and those classified phrases may be used to train a machine learning model to identify the types of calls as such.

Embodiments described herein may include a voice-to-text converter component configured for converting audio data to text data, as known to a person to one of ordinary skill in the art. For example, audio data received from a telephonic call placed from a caller to a user may be converted to corresponding text data.

Embodiments described herein may include a pattern matching component configured to receive input data from the voice-to-text converter component and process the input data using pattern matching algorithms (i.e., Knuth-Morris-Pratt (KMP) exact pattern matching, Rabin-Karp pattern matching, Boyer-Moore pattern matching, etc.) to compare input text data to known text data patterns to determine if a match exists. Further, the pattern matching component may be configured to perform hourly, daily, weekly, monthly, etc., synchronizations from a central server to fetch any new threat pattern definitions. For example, pattern matching component may be configured to use a no-structured language query (SQL) database (DB) such as Mongo database to perform synchronizations.

Embodiments described herein may include a central server configured to receive updates corresponding to new threat pattern definitions, wherein the one or more processors may be configured to perform cyclical updates to receive and download data corresponding to new threat patterns. For example, the central server may be implemented using Java technology and a No-SQL DB such as Mongo DB. Furthermore, the one or more processors may be configured to inculcate the above-described patterns and interject the knowledge base at inflection points.

Embodiments described herein may include a user device including a user interface configured to use angular JavaScript to receive user input data corresponding to user preferences and settings to execute embodiments described herein. For example, Java and all Java-based trademarks and logos are trademarks or registered trademarks of Oracle and/or its affiliates.

Further, embodiments described herein may be configured to process the input data (e.g., audio data, text data) using natural language model to detect the types of phrases, and incorrect phrasing, that are typical of scam calls. Furthermore, embodiments described herein may be configured to use machine learning techniques to augment and extend pattern definitions, thereby facilitating continuous learning about fraudulent call signatures. Even further, embodiments described herein may be configured to use predictive analytics to augment and extend pattern definitions.

Focusing on natural language understanding, its goal is to comprehend a natural language utterance ranging from the syntactic composition and the roles of words in a sentence to its semantic meaning, context, and other tasks. Embodiments described herein focus on the task of identifying specific phrase content and sentence structures to determine which phrase is more likely to be associated with a spam or fraud caller and which phrases do not. Identifying the type of phrase in a sentence is useful for performing classifications in multiple scenarios. For example, identifying phrases in sentences that are spam (i.e., unauthorized solicitations) or fraudulent (i.e., soliciting confidential financial information for unauthorized use) provides an advantage for embodiments described herein to alert the user to the bad act attempt and empowers the user to take appropriate action. Further, embodiments described herein may be configured to automatically take remedial action to shield the user from the unwanted interaction.

Embodiments described herein provide computer-implemented methods configured to train a machine learning model to identify natural language utterances or phrases in a voice call greeting that is fraudulent or spam (e.g., "Please enter your social security number now" and "would you like to purchase insurance") vs. those that are legitimate (e.g., "This is Flo from your insurance company, company identification no. 12345 and I would like to speak to Mr. Safe who is a current client."). Unlike performing intent recognition that also takes into account the domain of the request, this classification may be domain independent. For example, a dataset of natural language statements in a particular language (e.g., English) may be compiled from existing benchmarks in the literature and the dataset may be labeled based on the two classes (i.e., fraudulent, legitimate). Further, machine learning models (e.g., shallow, deep learning) may be trained on various features including sentence embeddings and syntactic features. As a result, a specific natural language task and identification of its importance in messaging dialog systems are defined and contributed to the embodiments described herein. Further, embodiments described herein include labeled collections of sentences and/or phrases and a machine learning model that has learned the classification task.

Embodiments described herein may be applied to both voice data or text data, wherein a fraudulent call may be identified based at least on determining whether a phrase uttered during the call matches a known fraudulent phrase. Understanding when a phrase is fraudulent or legitimate helps determine whether the user should continue with the call or it should be ended and the call information added to a list of known fraudulent callers.

In an embodiment, to learn a classification task, an appropriate dataset is created to train the machine learning model. The dataset primarily distinguishes between phrases associated with fraudulent calls and phrases associated with legitimate calls. For example, the classification task may be configured to determine a risk score associated with an incoming call, wherein if the incoming call exceeds a risk threshold, the one or more processors may be configured to pause the incoming call, generate a notification to inform the use of the call risk, and automatically request identification information (e.g., an official call back number, name, company, etc.) from the incoming caller.

Embodiments described herein may include one or more models to choose from for a specific application based on certain application parameters. For example, application parameters may include complexity/simplicity of the problem, computational constraints (e.g., space and time) on training/testing, and problem characteristics (e.g., feature independence/dependence, amount of data noise, stochasticity, stationarity), among others. Each model may have a set of hyper-parameters that may be tuned to optimize training (e.g., feature mapping function, number of hidden neurons).

Embodiments described herein may include various types of machine learning models and techniques for training the machine learning models are used in improving intent determination in the messaging dialog manager system. For example, supervised learning techniques may be used on shallow models (e.g., SVM, k-nearest neighbor (kNN), random forest, decision tree, naïve Bayes) to serve as a baseline for comparison with deep learning models. Further, embodiments described herein may include performing grid search to fine-tune the hyper-parameters for SVM models, kNN models, or multi-later perceptron (MLP) models.

Embodiments described herein may include deep learning models to emulate the bidirectional-Long Short-Term Memory (LSTM) model to provide state of the art results for Natural Language Processing (NLP) tasks. For example, in a conversational environment, both the front and back halves of a sentence may be analyzed to provide the context to help in determining the meaning or intent of a sentence. Thus, a bidirectional-LSTM may provide improved results in analyzing the sentence in both front and back portions as opposed to a uni-directional LSTM.

Embodiments described herein use an array of datasets from conversational natural language literature to train the machine learning models. For a ground truth, the data may be annotated in a semiautomatic fashion to create a 45% (i.e., label: fraudulent)—55% (label: legitimate) data split. For example, semiautomatic annotation may include identifying labels of data points on the source of data, wherein an example sentence (e.g., "Please enter your social security number now") from a dataset that strongly correlates to a fraudulent call would be labeled as such. Other sentences resembling the example sentence would be similarly labeled if they share the same properties and structure. Alternatively, another example sentence (e.g., "this is your credit card company calling to verify a transaction on your account to prevent fraud") from the dataset that strongly correlates to a legitimate call would be labeled as such.

Embodiments described herein may include training the machine learning models using a combination of pretrained BERT sentence embeddings and call type tags as input features to the machine learning models. For example, the input sentence embeddings may include dimensions of 768, 400, 200, or 100, scaling by a factor of approximately 2. Further, the sentence embeddings may be visualized in a 2-dimensional space by applying t-Distributed Stochastic Neighbor Embedding (t-SNE) with a perplexity of 50 on the 768-dimension sentence vectors. Further, 10-fold cross validation may be performed on the sentence vectors to report the train/validation performance.

Embodiments described herein may also include capturing more natural language structure from the sentences by appending call type tags (e.g., machine, human, narrative, interrogatory) of the sentences to the feature set. By including the call type tags, the models realize an improved performance because the call type tags assist the model in learning the natural language sentence structures. Furthermore, aggregating all shadow model results and feature sets, the SVM-based classifier model results in the least bias and generalizes well on unseen data when trained on call type tag features and BERT sentence embeddings.

Embodiments of the present invention recognize that a custom solution is desired for detecting and resolving fraudulent calls in an efficient and convenient manner. Implementations of embodiments of the invention may take a variety of forms, and exemplary implementation details are discussed subsequently with reference to the Figures.

Figure 1:
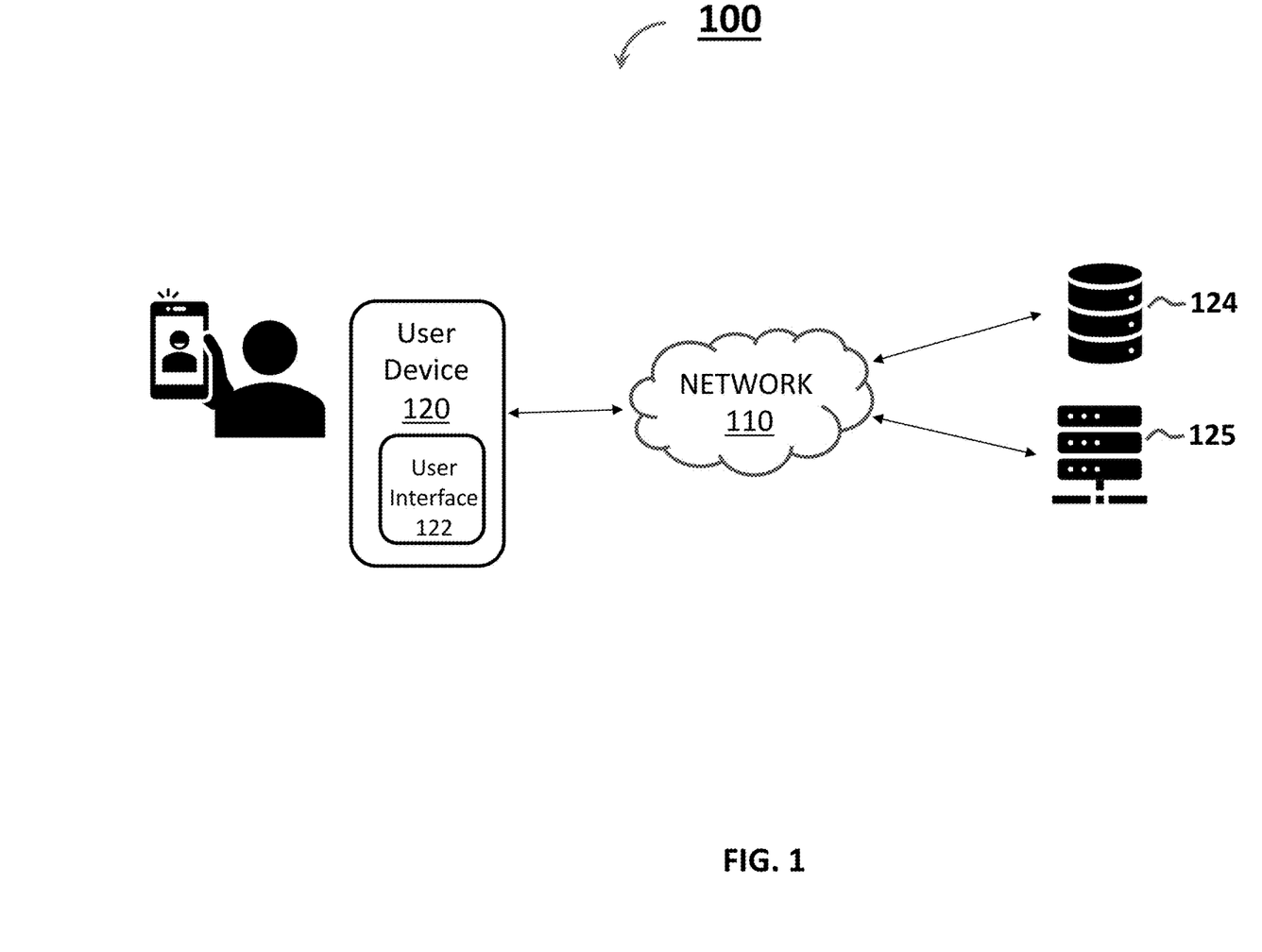
FIG. 1 depicts a block diagram of a distributed data processing environment for detecting and resolving fraudulent calls, in accordance with an embodiment of the present invention.

FIG. 1 depicts a block diagram of a distributed data processing environment for improving intent determination in a messaging dialog manager system, in accordance with an embodiment of the present invention. FIG. 1 provides only an illustration of one embodiment of the present invention and does not imply any limitations with regard to the environments in which different embodiments may be implemented. In the depicted embodiment, distributed data processing environment 100 includes user device 120, server 125, and database 124, interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between user device 120, server 125, and database 124. Distributed data processing environment 100 may also include additional servers, computers, or other devices not shown.

The term "distributed" as used herein describes a computer system that includes multiple, physically distinct devices that operate together as a single computer system. Many modifications to the depicted environment may be made by those skilled in the art without departing from the scope of the invention as recited by the claims.

Figure 5:
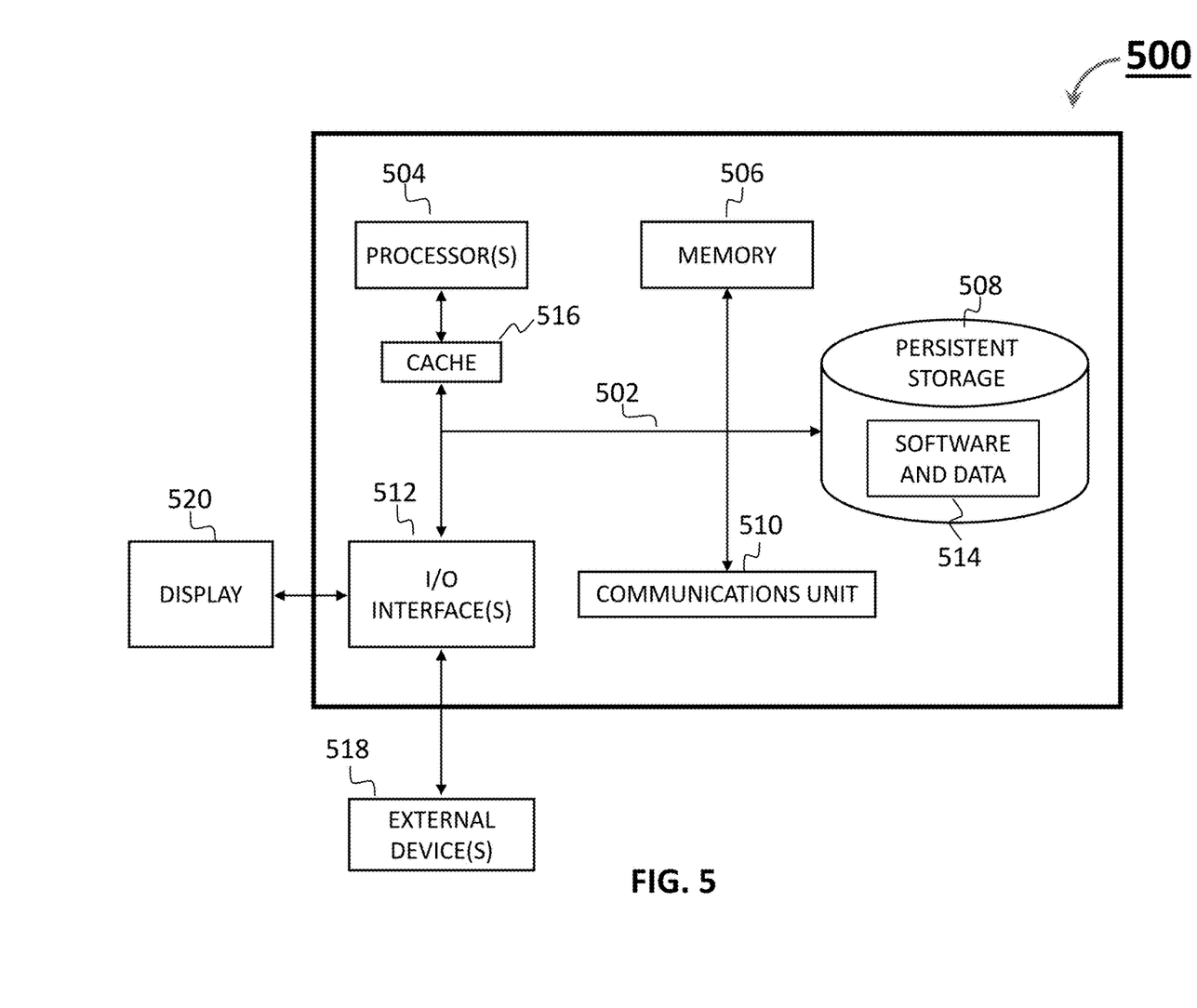
FIG. 5 depicts a block diagram of components of a server computer within the distributed data processing environment of FIG. 1, in accordance with an embodiment of the present invention.

User device 120 may operate to execute at least a part of a computer program for improving intent determination in a messaging dialog manager system. In an embodiment, user device 120 may be configured to send and/or receive data from one or more of database 124 and server 125 via network 110. User device 120 may include user interface 122 configured to facilitate interaction between a user and user device 120. For example, user interface 122 may include a display as a mechanism to display data to a user and may be, for example, a touch screen, light emitting diode (LED) screen, or a liquid crystal display (LCD) screen. User interface 122 may also include a keypad or text entry device configured to receive alphanumeric entries from a user. User interface 122 may also include other peripheral components to further facilitate user interaction or data entry by user associated with user device 120.

In some embodiments, user device 120 may be a management server, a web server, or any other electronic device or computing system capable of receiving and sending data. In some embodiments, user device 120 may be a laptop computer, tablet computer, netbook computer, personal computer (PC), a desktop computer, a smart phone, or any programmable electronic device capable of communicating with database 124, server 125 via network 110. User device 120 may include components as described in further detail in FIG. 5.

Database 124 operates as a repository for data flowing to and from network 110. Examples of data include data corresponding to communications entered and received via user interface 122. A database is an organized collection of data. Database 124 can be implemented with any type of storage device capable of storing data and configuration files that can be accessed and utilized by user device 120, such as a database server, a hard disk drive, or a flash memory. In an embodiment, database 124 is accessed by user device 120 to store data corresponding to messaging communications with via user interface 122. In another embodiment, database 124 may reside elsewhere within distributed network environment 100 provided database 124 has access to network 110.

Server 125 can be a standalone computing device, a management server, a web server, or any other electronic device or computing system capable of receiving, sending, and processing data and capable of communicating with user device 120 and/or database 124 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 5.

Figure 2:
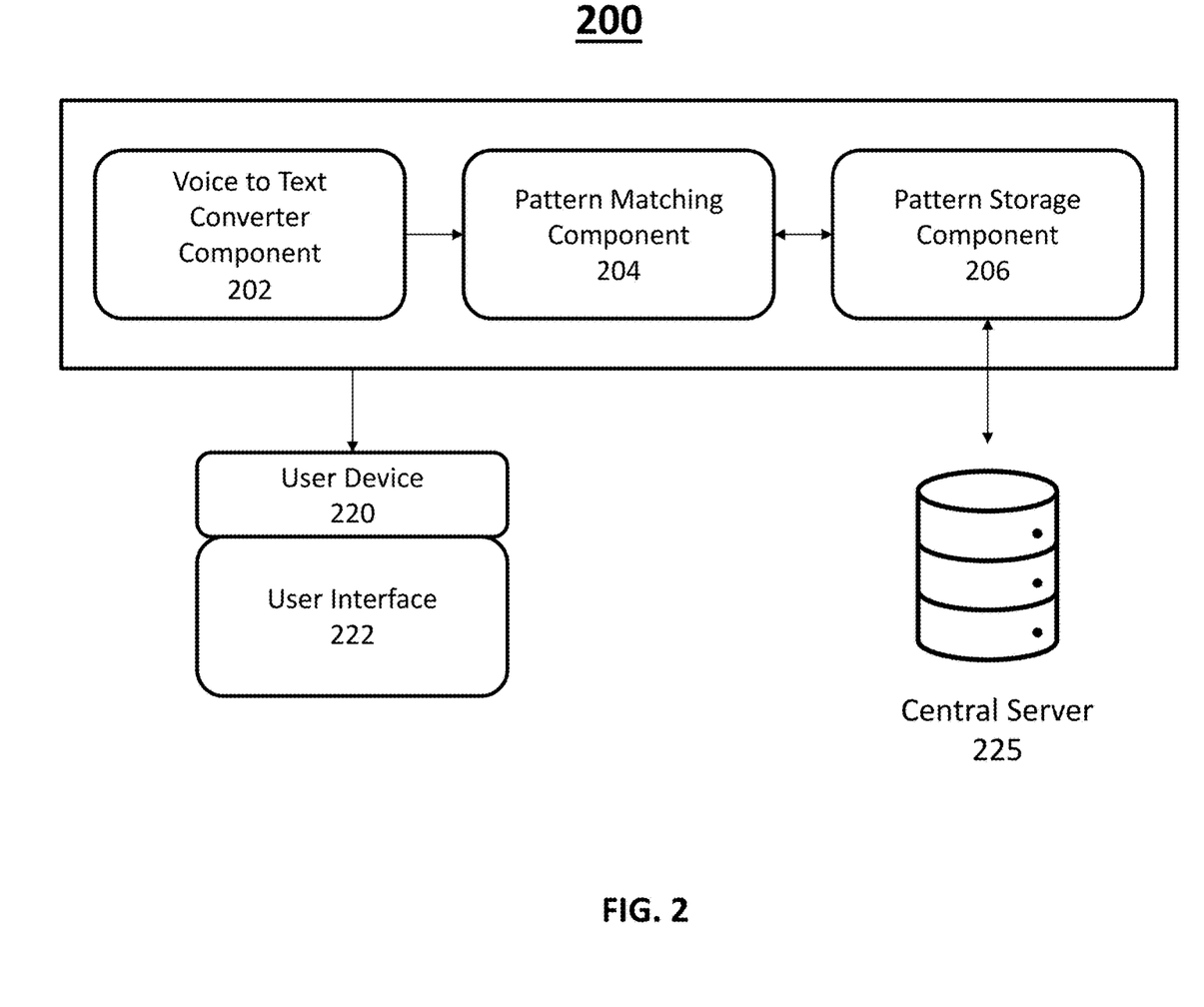
FIG. 2 depicts block diagram of a system for detecting and resolving fraudulent calls, in accordance with an embodiment of the present invention.

FIG. 2 depicts a block diagram of a system 200 for detecting and resolving fraudulent calls, in accordance with an embodiment of the present invention.

In an embodiment, system 200 may include voice to text converter component 202 configured to receive voice call data corresponding to an incoming telephone call placed to a user device and convert caller voice data in the voice call data to caller text data comprising one or more text phrases. For example, the user device may be configured to receive a telephonic call from a caller and detect audio signals being transmitting by the caller to the user device. Voice to text converter component 202 may be configured to convert the detected audio signals to text data representing the audio signals.

In an embodiment, system 200 may include pattern matching component 204 configured to determine that the one or more text phrases satisfies a first condition, wherein the first condition may be satisfied if one or more of a phrase score for each of the one or more text phrases exceeds a predetermined threshold. For example, voice to text converter component 202 may be configured to transmit the text data to pattern matching component 204 to process the text data to determine of the text data include one or more text phrases that satisfy a condition. The condition may include the text data exceeding a similarity threshold with one or more recognized phrases, wherein the recognized phrases may include a phrase corresponding to a fraudulent phone call or a legitimate phone call.

In an embodiment, system 200 may include pattern storage component 206 configured to store data corresponding to phrases that match fraudulent phrases and phrases that match legitimate phrases. For example, pattern matching component 204 may be configured to transmit data corresponding to classifications of each of the text data regarding if the text data satisfies a condition or not. For instance, for each determination of whether text data corresponds to a fraudulent call or a legitimate call, pattern storage component 206 may be configured to save the classification determination in central server 225 to be available for access by system 200 at a later time. By saving or storing the classification determinations in central server 225, pattern matching component 204 may be configured to improve the classification determination process.

In an embodiment, pattern matching component 204 may be configured to receive user feedback data from a user device corresponding to an indication of a fraudulent call or a legitimate call from a user. For example, if a call is placed to a user device and the user accepts the call, then the one or more processors may be configured to generate a user prompt or a user selectable icon to solicit user feedback from the user via the user interface of the user device. The user feedback may include an indication of a fraudulent call or a legitimate call, wherein the indication may be transmitted to one or more of pattern matching component 204 and pattern storage component 206 for further processing to be saved or stored to improve future classification determinations. For example, if an indication of a fraudulent call is received from the user device, then the corresponding text data received from the caller may be associated with a fraudulent call. Further for example, if an indication of a legitimate call is received from the user device, then the corresponding text data received from the caller may be associated with a legitimate call.

In an embodiment, system 200 may include one or more processors configured for associating an identifier associated with a fraudulent caller as a fraudulent phone number and save the association for further use as described herein. Even further, system 200 may include one or more processors configured for identifying a fraudulent phone number as an incoming caller to user device and automatically decline the fraudulent incoming caller to prevent user device from generating an alert for the fraudulent call.

In an embodiment, system 200 may include user device 220 configured to generate alerts via user interface 222 when an incoming phone call tends to be fraud based on minimum and maximum predetermined thresholds. Further, the alerts may include a danger scale based on the threat level and a fraud report may be generated for presentation to the user or for updating the central server 225. Further, system 200 may include central server 225 configured to update system 200 with new threat patterns and/or definitions and fraud reporting.

In an embodiment, system 200 may include one or more processors configured to generate user interface 222 on a display of a computing device, such as user device 220 (e.g., user device 120 of FIG. 1).

Figure 3:
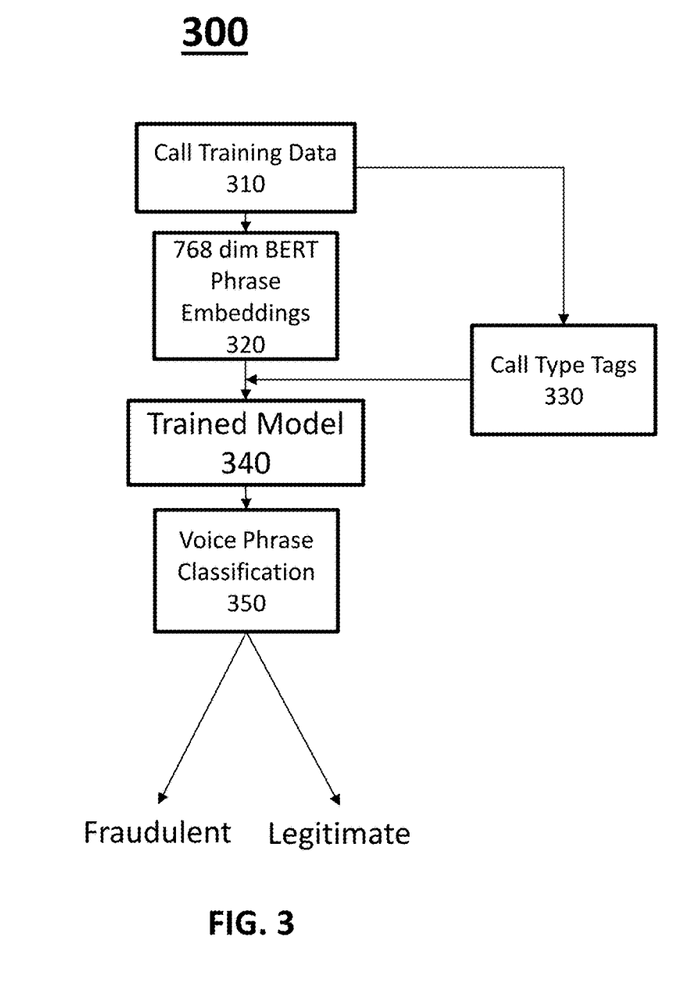
FIG. 3 depicts a model for detecting and resolving fraudulent calls, in accordance with an embodiment of the present invention.

FIG. 3 depicts model 300 for detecting and resolving fraudulent calls, in accordance with an embodiment of the present invention.

While the foregoing describes implementation of a machine learning model, the present disclosure is not limited thereto. In at least some embodiments, a machine learning model may implement a trained component or trained model configured to perform the processes described above. The trained component may include one or more machine learning models, including but not limited to, one or more classifiers, one or more neural networks, one or more probabilistic graphs, one or more decision trees, and others. In other embodiments, the trained component may include a rules-based engine, one or more statistical-based algorithms, one or more mapping functions or other types of functions/algorithms to determine whether a natural language input is a complex or non-complex natural language input. In some embodiments, the trained component may be configured to perform binary classification, where the natural language input may be classified into one of two classes/categories. In some embodiments, the trained component may be configured to perform multiclass or multinomial classification, where the natural language input may be classified into one of three or more classes/categories. In some embodiments, the trained component may be configured to perform multi-label classification, where the natural language input may be associated with more than one class/category.

Various machine learning techniques may be used to train and operate trained components to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

In an embodiment, model 300 may include call training data 310 comprising a plurality of text phrases corresponding to fraudulent phrases or legitimate phrases.

In an embodiment, model 300 may include 768 dimension BERT phrase embeddings 320 determined based on call training data 310, wherein the text phrases of call training data 310 are embedded with dimensional features for input to trained model 340 as model input data.

In an embodiment, model 300 may also include one or more processors configured for capturing more natural language structure from the text phrases by appending call type tags 330 (e.g., machine, human, narrative, interrogatory) of the sentences to the feature set. By including call type tags 330, the models realize an improved performance because the call type tags 330 assist the model in learning the natural language phrase and sentence structures. Furthermore, aggregating all shadow model results and feature sets, the SVM-based classifier model results in the least bias and generalizes well on unseen data when trained on call type tag 330 features and BERT sentence embeddings (e.g., 768 dim BERT phrase embeddings 320).

Embodiments described herein may include training the machine learning models (e.g., trained model 340) using a combination of pretrained BERT phrase embeddings (e.g., 768 dim BERT phrase embeddings 320) and call type tags 330 as input features to the machine learning models. For example, the input sentence (or phrase) embeddings may include dimensions of 768, 400, 200, or 100, scaling by a factor of approximately 2. Further, the phrase embeddings may be visualized in a 2-dimensional space by applying t-Distributed Stochastic Neighbor Embedding (t-SNE) with a perplexity of 50 on the 768-dimension phrase vectors (e.g., 768 dim BERT phrase embeddings 320). Further, 10-fold cross validation may be performed on the phrase vectors to report the train/validation performance.

In an embodiment, model 300 may include trained model 340 configured as a Natural Language Processing (NLP) engine to interpret call training data 310 phrases embedded as 768 dim BERT phrase embeddings 320 and active incoming call data received at user device 120. An NLP engine is a core component that interprets statements at any given time and converts the statements to structured inputs that the system can process. NLP engines may contain advanced machine learning algorithms to identify intent in caller statements and further matches caller intent to a list of available classifications determined and saved within the system. For example, NLP engines may use either finite state automatic models or deep learning models to generate system-generated responses to caller statements. NLP engine may include an intent classifier and an entity extractor, wherein the intent classifier may be configured to interpret the natural language of a statement and the entity extractor may be configured to extract key information or keywords from the statement.

In an embodiment, model 300 may include one or more processors configured for identifying caller voice data corresponding to a natural language (NL) text in the text data. For example, an NLP engine may be configured to process the text data to identify NL text in the voice data and to process the text data to identify NL text in the caller voice data.

In an embodiment, model 300 may further include one or more processors configured for processing, by trained model 300, the embedded call training data 310 to generate model output data corresponding to a voice phrase classification 350. Further, model 300 may be configured for determining the NL text as the call training data 310 that corresponds to a fraudulent call if the voice phrase classification 350 satisfies a condition. The voice phrase classification 350 may correspond to a first class (class 1) indicating that the call is a fraudulent call or a second class (class 0) indicating that the voice data corresponds to a legitimate call. A class 0 text data comprising a NL utterance might be a legitimate call from an agent of a user's financial institution, insurance agency, or some other official entity through which user has an established relationship. Class 1 NL utterances are not legitimate calls because they were placed by unsolicited callers seeking to obtain information from the user that the user may not have authorized. A condition may include a binary classification or a score corresponding to a binary classification.

In an embodiment, the machine learning model (e.g., trained model 340) may include a shallow model, as described above herein, wherein the shallow model is trained on various features (e.g., sentence embeddings, syntactic features) configured to generate model output data (e.g., voice phrase classification 350) in response to receiving and processing NL text data. The model output data may include a binary classification indicating whether the NL text data corresponds to a fraudulent call or corresponds to a legitimate call.

In an embodiment, the machine learning model (e.g., trained model 340) may include a deep learning model, as described above herein, wherein the deep learning models are trained on various features (e.g., sentence embeddings, syntactic features) configured to generate model output data in response to receiving and processing NL text data. The model output data may include a binary classification indicating whether the NL text data corresponds to a fraudulent call or corresponds to a legitimate call. This determination improves the user experience in situations where the user would prefer not to field numerous fraudulent calls.

Figure 4:
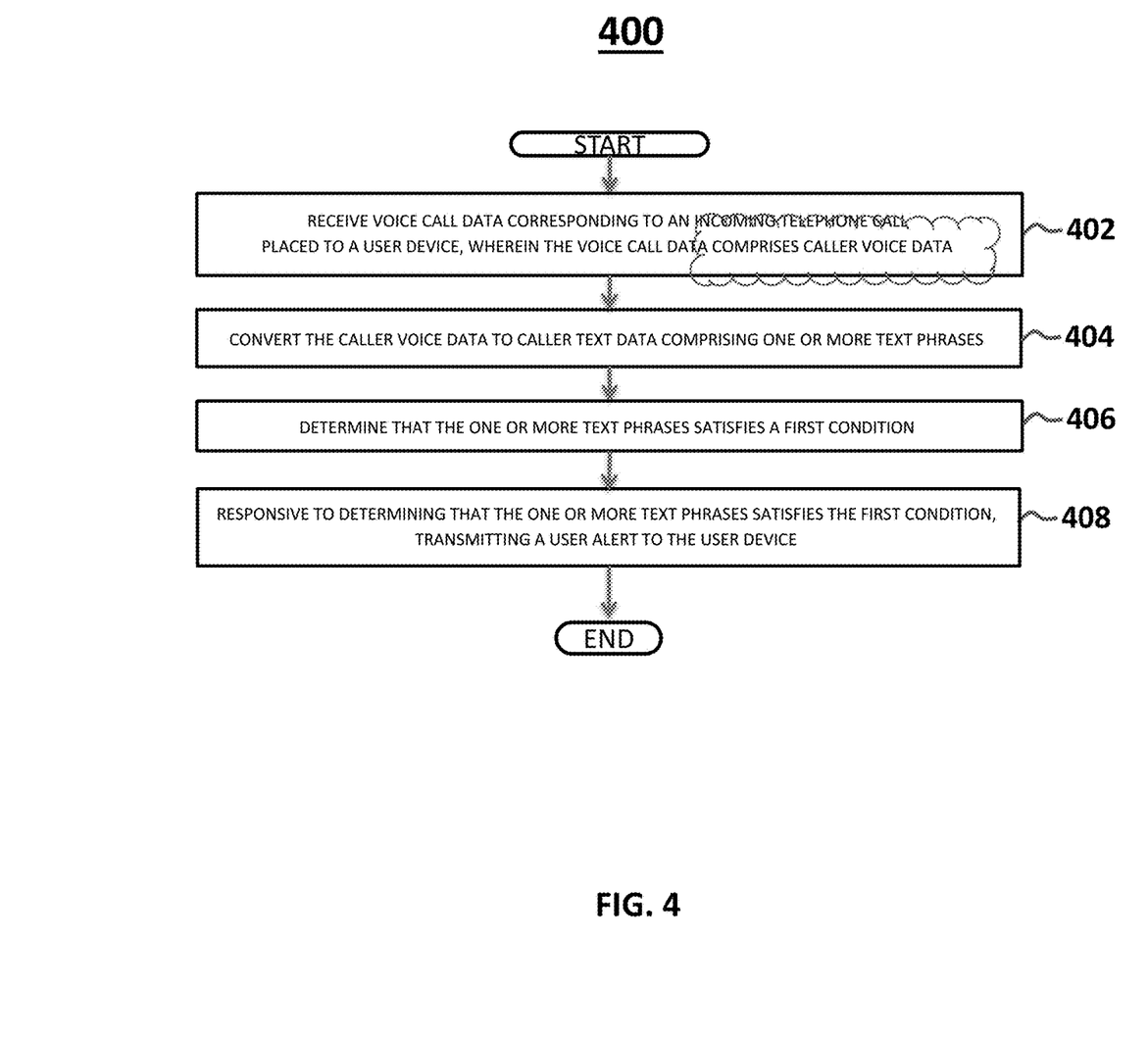
FIG. 4 depicts operational steps of a computer-implemented method for detecting and resolving fraudulent calls, in accordance with an embodiment of the present invention.

FIG. 4 depicts operational steps of computer-implemented method 400 for detecting and resolving fraudulent calls, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

In an embodiment, computer-implemented method 400 may include one or more processors configured to receive 402 voice call data corresponding to an incoming telephone call placed to a user device, wherein the voice call data comprises one or more of a caller identification number and caller voice data.

In an embodiment, computer-implemented method 400 may include one or more processors configured to convert 404 the caller voice data to caller text data comprising one or more text phrases.

In an embodiment, computer-implemented method 400 may include one or more processors configured to determine 406 that the one or more text phrases satisfies a first condition. Furthermore, computer-implemented method 400 may be configured for transmitting the caller text data to a pattern matching module, determining a phrase score for each of the one or more text phrases based on the one or more text phrases and a plurality of fraudulent phrases, and determining that the one or more text phrases satisfies the first condition. In an embodiment, a condition may include that the one or more text phrases exceeds a predetermined threshold based on the risk of the call. For example, if the phrase score for each of the one or more text phrases exceeds a predetermined threshold, then a risk score for the call may be determined based on an aggregation of the text phrase scores. Even further for example, if one of the text phrases has a risk score that exceeds a predetermined threshold, then the risk score for the call may be determined to be a critical risk score, regardless of the risk scores for the remaining text phrases.

In an embodiment, responsive to determining that the one or more text phrases satisfies a condition, computer-implemented method 400 may include one or more processors configured to transmit 408 a user alert to the user device. Furthermore, prior to transmitting the user alert to the user device, computer-implemented method 400 may be configured for placing the telephone call on hold and outputting the user alert to the user device, wherein the user alert may include a message to the user to not share user information with the caller on the incoming call.

In an embodiment, responsive to determining that the one or more text phrases satisfies the first condition, computer-implemented method 400 may be configured for outputting a caller audible message to solicit caller information from a caller originating the incoming telephone call, receiving the caller information from the caller, and storing the caller information in a database, wherein the caller information may include one or more of a call back number and a caller entity name.

Furthermore, computer-implemented method 400 may be configured for placing a first outgoing telephone call based on the caller information, outputting audible verification messages to solicit verification information from the caller, receiving the verification information from the caller, and determining whether the incoming call is a fraudulent call based on the verification information.

Even further, computer-implemented method 400 may be configured for determining that the caller identification number is based on a comparison to a list of previously identified caller identification numbers. In an embodiment, responsive to determining that the caller identification number is the legitimate number, computer-implemented method 400 may be configured for placing a second outgoing telephone call to the caller identification number. Even further, responsive to determining that the caller identification number is the fraudulent number, computer-implemented method 400 may be configured for tagging the caller identification number with a fraud tag.

In an embodiment, computer-implemented method 400 may be configured for processing, at a machine learning model, call training data comprising a plurality of phrases corresponding to one or more of fraudulent calls and legitimate calls, receiving, at the machine learning model, the caller voice data comprising one or more voice phrases, and generating, by the machine learning model, model output data corresponding to a classification for the one or more voice phrases.

FIG. 5 depicts a block diagram of components of the server computer (e.g., computing device 500, user device 120) within the distributed data processing environment of FIG. 1, in accordance with an embodiment of the present invention.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs, as described herein, may be downloaded to persistent storage 508 through communications unit 510.

I/O interface(s) 512 allows for input and output of data with other devices that may be connected to user device 120. For example, I/O interface 512 may provide a connection to external devices 518 such as image sensor, a keyboard, a keypad, a touch screen, and/or some other suitable input device. External devices 518 can also include portable computer readable storage media such as, for example, thumb drives, portable optical or magnetic disks, and memory cards. Software and data 514 used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Software and data 514 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a computer system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of computer-implemented methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, comprising:
receiving, by one or more processors, training data comprising a plurality of text phrases corresponding to fraudulent phrases or legitimate phrases;
training, by the one or more processors, a machine learning model on call type tags of sentences in the training data and embeddings of the sentences;
receiving, by the one or more processors, voice call data corresponding to an incoming telephone call placed to a user device, wherein the voice call data comprises caller voice data;
converting, by the one or more processors, the caller voice data to caller text data comprising one or more caller text phrases;
using the machine learning model to generate, by the one or more processors, a voice phrase classification;
using the voice phrase classification to determine, by the one or more processors, whether the one or more caller text phrases are corresponding to a fraudulent call or a legitimate call; and
responsive to determining that the one or more caller text phrases are corresponding to the fraudulent call, transmitting, by the one or more processors, a user alert to the user device.

2. The computer-implemented method of claim 1, further comprising:
transmitting, by the one or more processors, the caller text data to a pattern matching module;
determining, by the one or more processors, a phrase score for each of the one or more caller text phrases based on the one or more text phrases and a plurality of fraudulent phrases; and
determining, by the one or more processors, that the one or more caller text phrases are corresponding to the fraudulent call if one or more of the phrase score for each of the one or more caller text phrases exceeds a predetermined threshold.

3. The computer-implemented method of claim 1, further comprising:
prior to transmitting the user alert to the user device, placing, by the one or more processors, the incoming telephone call on hold; and
outputting, by the one or more processors, the user alert to the user device, wherein the user alert comprises a message to the user device to not share user information.

4. The computer-implemented method of claim 1, further comprising:
responsive to determining that the one or more caller text phrases are corresponding to the fraudulent call, outputting, by the one or more processors, a caller audible message to solicit caller information from a caller originating the incoming telephone call;
receiving, by the one or more processors, the caller information from the caller; and
storing, by the one or more processors, the caller information in a database, wherein the caller information comprises one or more of a call back number and a caller entity name.

5. The computer-implemented method of claim 4, further comprising:

placing, by the one or more processors, a first outgoing telephone call based on the caller information;
outputting, by the one or more processors, audible verification messages to solicit verification information from the caller;
receiving, by the one or more processors, the verification information from the caller; and
determining, by the one or more processors, whether the incoming call is a fraudulent call based on the verification information.

6. The computer-implemented method of claim 4, wherein the voice call data further comprises a caller identification number, further comprising:
responsive to determining that the caller identification number is the fraudulent number based on a comparison to a list of previously identified caller identification numbers, tagging, by the one or more processors, the caller identification number with a fraud tag.

7. The computer-implemented method of claim 1, further comprising:
processing, at a machine learning model, call training data comprising a plurality of phrases corresponding to one or more of fraudulent calls and legitimate calls;
receiving, at the machine learning model, the caller voice data comprising one or more voice phrases; and
generating, by the machine learning model, model output data corresponding to a classification for the one or more voice phrases.

8. A computer program product, comprising:
one or more computer readable storage media and program instructions collectively stored on the one or more non-transitory computer readable storage media, the stored program instructions comprising:
program instructions to receive training data comprising a plurality of text phrases corresponding to fraudulent phrases or legitimate phrases;
program instructions to train a machine learning model on call type tags of sentences in the training data and embeddings of the sentences;
program instructions to receive voice call data corresponding to an incoming telephone call placed to a user device, wherein the voice call data comprises caller voice data;
program instructions to convert the caller voice data to caller text data comprising one or more caller text phrases;
program instructions to use the machine learning model to generate a voice phrase classification;
program instructions to use the voice phrase classification to determine whether the one or more text caller phrases are corresponding to a fraudulent call or a legitimate call; and
responsive to the program instructions to determine that the one or more caller text phrases are corresponding to the fraudulent call, program instructions to transmit a user alert to the user device.

9. The computer program product of claim 8, further comprising:
program instructions to transmit the caller text data to a pattern matching module;
program instructions to determine a phrase score for each of the one or more caller text phrases based on the one or more text phrases and a plurality of fraudulent phrases; and
program instructions to determine that the one or more caller text phrases are corresponding to the fraudulent call if one or more of the phrase score for each of the one or more caller text phrases exceeds a predetermined threshold.

10. The computer program product of claim 8, further comprising:
prior to the program instructions to transmit the user alert to the user device, program instructions to place the incoming telephone call on hold; and
program instructions to output the user alert to the user device, wherein the user alert comprises a message to the user device to not share user information.

11. The computer program product of claim 8, further comprising:
responsive to the program instructions to determine that the one or more caller text phrases are corresponding to the fraudulent call, program instructions to output a caller audible message to solicit caller information from a caller originating the incoming telephone call;
program instructions to receive the caller information from the caller; and
program instructions to store the caller information in a database, wherein the caller information comprises one or more of a call back number and a caller entity name.

12. The computer program product of claim 11, further comprising:
program instructions to place a first outgoing telephone call based on the caller information;
program instructions to output audible verification messages to solicit verification information from the caller;
program instructions to receive the verification information from the caller; and
program instructions to determine whether the incoming call is a fraudulent call based on the verification information.

13. The computer program product of claim 11, wherein the voice call data further comprises a caller identification number, further comprising:
responsive to program instructions to determine that the caller identification number is the fraudulent number based on a comparison to a list of previously identified caller identification numbers, program instructions to tag the caller identification number with a fraud tag.

14. The computer program product of claim 8, further comprising:
program instructions to process, at a machine learning model, call training data comprising a plurality of phrases corresponding to one or more of fraudulent calls and legitimate calls;
program instructions to receive, at the machine learning model, the caller voice data comprising one or more voice phrases; and
program instructions to generate, by the machine learning model, model output data corresponding to a classification for the one or more voice phrases.

15. A computer system, comprising:
one or more computer processors;
one or more non-transitory computer readable storage media;
program instructions collectively stored on the one or more computer readable storage media for execution by at least one of the one or more computer processors, the stored program instructions comprising:
program instructions to receive training data comprising a plurality of text phrases corresponding to fraudulent phrases or legitimate phrases;
program instructions to train a machine learning model on call type tags of sentences in the training data and embeddings of the sentences;
program instructions to receive voice call data corresponding to an incoming telephone call placed to a user device, wherein the voice call data comprises caller voice data;
program instructions to convert the caller voice data to caller text data comprising one or more caller text phrases;
program instructions to use the machine learning model to generate a voice phrase classification;
program instructions to use the voice phrase classification to determine whether the one or more caller text phrases are corresponding to a fraudulent call or a legitimate call; and
responsive to the program instructions to determine that the one or more caller text phrases are corresponding to the fraudulent call, program instructions to transmit a user alert to the user device.

16. The computer system of claim 15, further comprising:
program instructions to transmit the caller text data to a pattern matching module;
program instructions to determine a phrase score for each of the one or more caller text phrases based on the one or more text phrases and a plurality of fraudulent phrases; and
program instructions to determine that the one or more caller text phrases are corresponding to the fraudulent call if one or more of the phrase score for each of the one or more caller text phrases exceeds a predetermined threshold.

17. The computer system of claim 15, further comprising:
program instructions to process, at a machine learning model, call training data comprising a plurality of phrases corresponding to one or more of fraudulent calls and legitimate calls;
program instructions to receive, at the machine learning model, the caller voice data comprising one or more voice phrases;
program instructions to generate, by the machine learning model, model output data corresponding to a classification for the one or more voice phrases;
prior to the program instructions to transmit the user alert to the user device, program instructions to place the incoming telephone call on hold; and
program instructions to output the user alert to the user device, wherein the user alert comprises a message to the user device to not share user information.

18. The computer system of claim 15, further comprising:
responsive to the program instructions to determine that the one or more caller text phrases are corresponding to the fraudulent call, program instructions to output a caller audible message to solicit caller information from a caller originating the incoming telephone call;
program instructions to receive the caller information from the caller; and
program instructions to store the caller information in a database, wherein the caller information comprises one or more of a call back number and a caller entity name.

19. The computer system of claim 18, further comprising:
program instructions to place a first outgoing telephone call based on the caller information;
program instructions to output audible verification messages to solicit verification information from the caller;
program instructions to receive the verification information from the caller; and
program instructions to determine whether the incoming call is a fraudulent call based on the verification information.

20. The computer system of claim 18, wherein the voice call data further comprises a caller identification number, further comprising:

responsive to program instructions to determine that the caller identification number is a fraudulent number based on a comparison to a list of previously identified caller identification numbers, program instructions to tag the caller identification number with a fraud tag.

\* \* \* \* \*